United States Patent
Walter et al.

(10) Patent No.: US 9,841,342 B2
(45) Date of Patent: Dec. 12, 2017

(54) LEAK DETECTION DEVICE AND METHOD FOR CHECKING OBJECTS FOR FLUID TIGHTNESS BY MEANS OF A LEAK DETECTION DEVICE

(75) Inventors: Gerhard Wilhelm Walter, Cologne (DE); Guenter Holstein, Cologne (DE); Christian Beyer, Cologne (DE)

(73) Assignee: LEYBOLD GMBH, Köln (DE)

( * ) Notice: Subject to any disclaimer, the term of this patent is extended or adjusted under 35 U.S.C. 154(b) by 509 days.

(21) Appl. No.: 14/131,073

(22) PCT Filed: May 18, 2012

(86) PCT No.: PCT/EP2012/059288
§ 371 (c)(1),
(2), (4) Date: Jan. 6, 2014

(87) PCT Pub. No.: WO2013/007432
PCT Pub. Date: Jan. 17, 2013

(65) Prior Publication Data
US 2014/0123732 A1     May 8, 2014

(30) Foreign Application Priority Data

Jul. 14, 2011   (DE) .................. 10 2011 107 334

(51) Int. Cl.
| | | |
|---|---|---|
| *G01M 3/04* | (2006.01) | |
| *G01M 3/02* | (2006.01) | |
| *G01M 3/20* | (2006.01) | |

(52) U.S. Cl.
CPC .............. *G01M 3/02* (2013.01); *G01M 3/202* (2013.01)

(58) Field of Classification Search
CPC ................................ G01M 3/02; G01M 3/202
USPC ............................................................. 73/40
See application file for complete search history.

(56) References Cited

U.S. PATENT DOCUMENTS

| | | | | |
|---|---|---|---|---|
| 3,186,214 A | * | 6/1965 | Roberts ................. | G01M 3/226 137/240 |
| 3,520,176 A | | 7/1970 | Becker | |
| 3,824,839 A | * | 7/1974 | Briggs .................. | G01M 3/202 73/40.7 |

(Continued)

FOREIGN PATENT DOCUMENTS

| | | |
|---|---|---|
| CN | 1742195 A | 3/2006 |
| DE | 19523430 A1 | 1/1996 |

(Continued)

OTHER PUBLICATIONS

International Search Report dated Apr. 7, 2003 for PCT application No. PCT/EP02/12601.

*Primary Examiner* — John Fitzgerald
*Assistant Examiner* — Rodney T Frank
(74) *Attorney, Agent, or Firm* — Ohlandt, Greeley, Ruggiero & Perle, LLP

(57) ABSTRACT

A leak detection device has a test chamber which, for evacuation, is connected to an evacuation pump device. Moreover, the test chamber is connected by a test gas line to a test gas pump device. The test gas pump device is connected, at its main inlet, to a test gas detector, such that a detection of test gas can take place using the counter-current principle. A valve device is arranged in the test gas line. This valve device has a test gas chamber for temporary storage of test gas removed from the test chamber.

10 Claims, 3 Drawing Sheets

(56) References Cited

U.S. PATENT DOCUMENTS

| | | | | |
|---|---|---|---|---|
| 4,735,084 | A * | 4/1988 | Fruzzetti | G01M 3/202 73/40.7 |
| 4,919,599 | A * | 4/1990 | Reich | F04D 19/046 415/90 |
| 4,984,450 | A * | 1/1991 | Burger | G01M 3/202 73/40.7 |
| 5,369,982 | A * | 12/1994 | Holthaus | G01M 3/202 73/40 |
| 5,375,456 | A | 12/1994 | Burns | |
| 5,537,857 | A * | 7/1996 | Grosse Bley | G01M 3/202 73/40 |
| 5,561,240 | A | 10/1996 | Ochiai et al. | |
| 5,585,548 | A * | 12/1996 | Grosse Bley | G01M 3/205 73/40.7 |
| 5,625,141 | A * | 4/1997 | Mahoney | G01M 3/202 73/40.7 |
| 5,708,194 | A * | 1/1998 | Bohm | G01N 33/0011 73/40.7 |
| 5,831,147 | A * | 11/1998 | Hoath | G01M 3/329 73/40.7 |
| 5,900,537 | A * | 5/1999 | Bohm | G01M 3/202 73/40.7 |
| 6,282,946 | B1 | 9/2001 | Gevaud et al. | |
| 6,354,141 | B1 * | 3/2002 | Pierrejean | G01M 3/20 73/40.7 |
| 6,415,650 | B1 * | 7/2002 | Bohm | G01M 3/202 340/605 |
| 7,600,989 | B2 * | 10/2009 | Bohm | F04D 19/046 417/423.4 |
| 2005/0066708 | A1 | 3/2005 | Grosse-Bley et al. | |
| 2005/0150274 | A1 * | 7/2005 | Vittozzi | G01M 3/205 73/40 |
| 2006/0034702 | A1 * | 2/2006 | Bohm | F04D 19/046 417/244 |
| 2006/0169028 | A1 * | 8/2006 | Beyer | F04D 19/04 73/40.7 |
| 2008/0060421 | A1 * | 3/2008 | Muller | G01M 3/229 73/49.2 |
| 2008/0307858 | A1 * | 12/2008 | McManus | G01M 3/226 73/40.7 |
| 2009/0072180 | A1 * | 3/2009 | Johnson | F16K 31/122 251/324 |
| 2009/0173144 | A1 * | 7/2009 | Lukens | G01M 3/229 73/40.7 |
| 2009/0277249 | A1 * | 11/2009 | Polster | G01M 3/229 73/40.7 |
| 2009/0277250 | A1 * | 11/2009 | Wetzig | G01M 3/205 73/40.7 |
| 2010/0005861 | A1 * | 1/2010 | Wetzig | G01M 3/202 73/40.7 |
| 2010/0223979 | A1 * | 9/2010 | Ploehn | G01N 15/0826 73/38 |
| 2013/0186183 | A1 * | 7/2013 | Dobler | F04D 19/046 73/49.3 |

FOREIGN PATENT DOCUMENTS

| | | | | |
|---|---|---|---|---|
| DE | 19522466 A | | 1/1997 | |
| DE | 10308420 A1 | | 9/2004 | |
| DE | 102010033373 A1 * | | 2/2012 | F04D 19/046 |
| DE | 102011107334 A1 | | 1/2013 | |
| EP | 0344345 A | | 12/1989 | |
| EP | 0475246 A | | 3/1992 | |
| EP | 1585951 A1 | | 10/2005 | |
| JP | 2006515666 A | | 6/2006 | |
| WO | 03042651 A1 | | 5/2003 | |
| WO | 2004077005 A1 | | 9/2004 | |

* cited by examiner

LEAK DETECTION DEVICE AND METHOD FOR CHECKING OBJECTS FOR FLUID TIGHTNESS BY MEANS OF A LEAK DETECTION DEVICE

BACKGROUND

1. Field of the Disclosure

The disclosure refers to a leak detection device as well as to a method for checking objects for fluid tightness by means of a leak detection device.

2. Discussion of the Background Art

Known counter-flow leakage search devices, as they are known for instance from EP 1 585 951, use a turbomolecular pump for leak detection. An object to be tested or a test chamber, in which the object under test is arranged, is connected to a backing pump via a test gas line. Further, the test gas line is connected to two or more intermediate inlets of the turbomolecular pump. The backing pump is connected to the outlet of the turbomolecular pump. At the inlet of the turbomolecular pump, a test gas detector is arranged, in particular in a chamber evacuated by the turbomolecular pump. This allows for the use of a test gas detector with a very high sensitivity. Detecting the test gas, which in particular is helium, is effected by the test gas flowing to the inlet within the turbomolecular pump against the main flow direction of the turbomolecular pump, whereby it can be detected by the test gas detector.

In EP 1 585 951, the test gas line is connected to the outlet region of the turbomolecular pump for a rough examination of the object. Because of the connection of the test gas line with the outlet region of the turbomolecular pump, the counter or return-flow path of the test gas is rather long within the turbomolecular pump. Only at a lower pressure in the test gas line can the test gas line be connected with an intermediate region of the turbomolecular pump, so that the counter-flow path is shortened. The test gas can be introduced into this intermediate region of the turbomolecular pump, if the pressure in the test gas line corresponds to the pressure in the intermediate region of the turbomolecular pump, leaving aside insignificant variations. Thus, a connection of the test gas line with a further intermediate inlet, whereby the counter-flow path is shortened further, is possible only at a later moment, when the test pressure is reduced further. Since the counter or return-flow paths are long, especially in the beginning of an examination of an object, the testing times and the response times are relatively long.

It is an object of the present disclosure to provide a leak detection device and a corresponding method for testing objects for tightness, by which testing times can be shortened.

SUMMARY

The leak detection device of the disclosure comprises a test chamber in which an object to be tested is arranged. As an alternative, a direct testing of the object can be made. An evacuation pump means is connected with the test chamber or the object for evacuation thereof. This pump comprises a backing pump so that the test chamber or the object can be evacuated down to a low pressure. In the test chamber or the object under test, pressures are achieved that correspond to at least a single distance of the background signal to the leakage value. Independent of the evacuation pump means, a test gas line is connected with the test chamber or the object. As an alternative, the line can also be connected with a line arranged between the test chamber or the object and the evacuation pump means so that it is not necessary to connect two lines with the test chamber. This is advantageous in particular in case of a direct connection with the object, since only one line has to be connected with the object, which then branches into a line leading to the evacuation pump means and a test gas line.

The test gas line is connected with an intermediate inlet of a test gas pump means. In a particularly preferred embodiment the test gas pump means is a turbomolecular pump, possibly in combination with a Holweck stage. In order to achieve low pressures, the outlet of the turbomolecular pump or the Holweck stage is connected with a backing pump. The main inlet of the test gas pump means, i.e. in particular the main inlet of the turbomolecular pump, is connected with a test gas detector. The detection of the test gas is performed according to the counter-flow principle. This means that the test gas flows in through the intermediate inlet and is conveyed along the main conveying path to the outlet of the test gas pump means. A small part of the test gas flows in the direction opposite to the main conveying direction along a counter-flow path from the intermediate inlet to the main inlet and can thus be detected by the test gas detector.

According to the disclosure a valve means with a test gas chamber is arranged in the test gas line. Thereby, it is possible to buffer test gas coming from the test chamber or the object in the test gas chamber. The buffered test gas is then supplied to the test gas pump means via the intermediate inlet and flows along the counter-flow path to the test gas detector. It is an essential advantage of the disclosure that the test gas pump means is operated independently of the evacuation pump means. Thus, it is possible to achieve a relatively low pressure already in the test gas pump means, whereas no correspondingly low pressure has to prevail yet in the test chamber itself. Owing to this low pressure achievable in the region of the test gas pump means it is possible to arrange the intermediate inlet of the test gas pump means near the main inlet so that the counter-flow path is short. This results in a significant shortening of the testing time. This is possible in particular because of the significantly smaller volume of the test gas chamber as compared to the volume of the test chamber or the object. The test gas present in the test gas chamber an thus be at a much higher pressure than the pressure in the test gas pump means without thereby affecting the functionality of the test gas pump means, in particular of the turbomolecular pump. This is the case, since only a small volume of test gas is supplied to the test gas pump means via the intermediate inlet.

In a first preferred embodiment the valve means comprises two valves between which the test gas chamber is arranged. In order to fill the test gas chamber with test gas from the test chamber or the object, the first valve is opened, which is arranged upstream of the test gas chamber in the flow direction, so that test gas flows into the test gas chamber. In a temporally subsequent step, the second valve is opened, possibly in dependence on the pressure prevailing in the region of the test gas pump means, so that the small volume of test gas from the test gas chamber flows to the intermediate inlet of the test gas pump means. At the beginning of the tightness check, a small volume of test gas can thus be supplied to the test gas pump means that has already been evacuated to a very low pressure. Thus, a short counter-flow path can be realized between the intermediate inlet to the test gas detector.

During this checking, the evacuation pump means can be used to further lower the pressure in the test chamber or the object. Thereafter, another test gas sample is drawn from the test chamber or the object, by opening the first valve again so that the test gas flows into the test gas chamber while the second valve is closed. Thereafter, the first valve is closed and the second valve is opened again so that the test gas flows to the test gas pump means and thus to the test gas detector. Thus, it is possible to perform a step-wise check the tightness of the object in a simple manner. It is another object of the disclosure that only small volumes of test gas are supplied to the test gas pump means and that, accordingly, in case of a leakage, only small amounts of test gas have to be discharged from the test gas pump means prior to checking the next object. Insofar, the leak detection device is ready for checking the next object after a very short time.

In a preferred embodiment the valve means is connected with a control means. In the first preferred embodiment of the valve means with two separate valves, the control means is used to appropriately control the valves, wherein the first valve is opened to supply test gas to the test gas chamber and the second valve is closed, and wherein, correspondingly, the second valve is opened and the first valve is closed to supply the test gas to the test gas pump means. The control thus ensures that the valves are not both open at any time, since this would cause a large volume of test gas to flow from the test chamber or the object under possibly relatively high pressure into the test gas pump means at the intermediate inlet. This could cause damage to the test gas pump means, in particular if the same is a turbomolecular pump.

Further, the control means preferably ensures that the second valve is opened only after the first valve has been closed.

In a further preferred embodiment of the disclosure the valve means comprises a single valve with an integrated test gas chamber. This valve can be designed such that by displacing a kind of double piston an inlet or an outlet of the valve can be opened or closed. Again, this valve is preferably controlled by means of a control means that effects the displacement of the double piston analogously to the opening and closing of the first and second valves of the valve means having two valves.

The disclosure further refers to a method for checking the tightness of objects by means of a leak detector device, wherein, in a particularly preferred embodiment, the above described leak detector device is used to implement the method. According to the method of the disclosure, a test gas is drawn into a test gas chamber from a test chamber or directly from an object under test. Thereafter, the connection between the test gas chamber and the test chamber or the object is interrupted. The test gas drawn is then supplied from the test gas chamber to a test gas pump means. The test gas pump means comprises a test gas detector or is connected with a test gas detector and performs a detection of the test gas according to the counter-flow principle. For this purpose, the test gas is preferably supplied to the test gas pump means via an intermediate inlet and is pumped from the test gas pump means in the main flow direction towards an outlet of the test gas pump means, in particular an outlet of a turbomolecular pump. A part of the test gas flows against the main flow direction along a counter-flow path from the intermediate inlet to the main outlet of the test gas pump means, with the test gas detector being arranged in the region of the main inlet. The method of the present disclosure also comprises the advantages described in the context of the leak detector device of the present disclosure.

Preferably, the test gas is drawn from the test gas chamber only when a predetermined pressure level is reached in the test gas pump means, in particular in the region of the intermediate inlet of the test gas pump means. In particular, test gas is successively drawn at different times from the test chamber or immediately from the object and is supplied to the test gas chamber. As provided for the present leak detector device, the test gas is supplied from the test gas chamber at a correspondingly low pressure at the intermediate inlet so that a short counter-flow path, and thus a short testing time, can be realized.

The test chamber or the object is preferably evacuated by means of an evacuation pump means which as at least functionally and mechanically independent of the test gas pump means. The evacuation pump means and the test gas pump means can be linked in terms of control technology only by the control means.

The following is a detailed description of the disclosure with reference to preferred embodiments and to the accompanying drawings.

BRIEF DESCRIPTION OF THE DRAWINGS

In the Figures.

DETAILED DESCRIPTION OF THE PREFERRED EMBODIMENT

Figure 1:
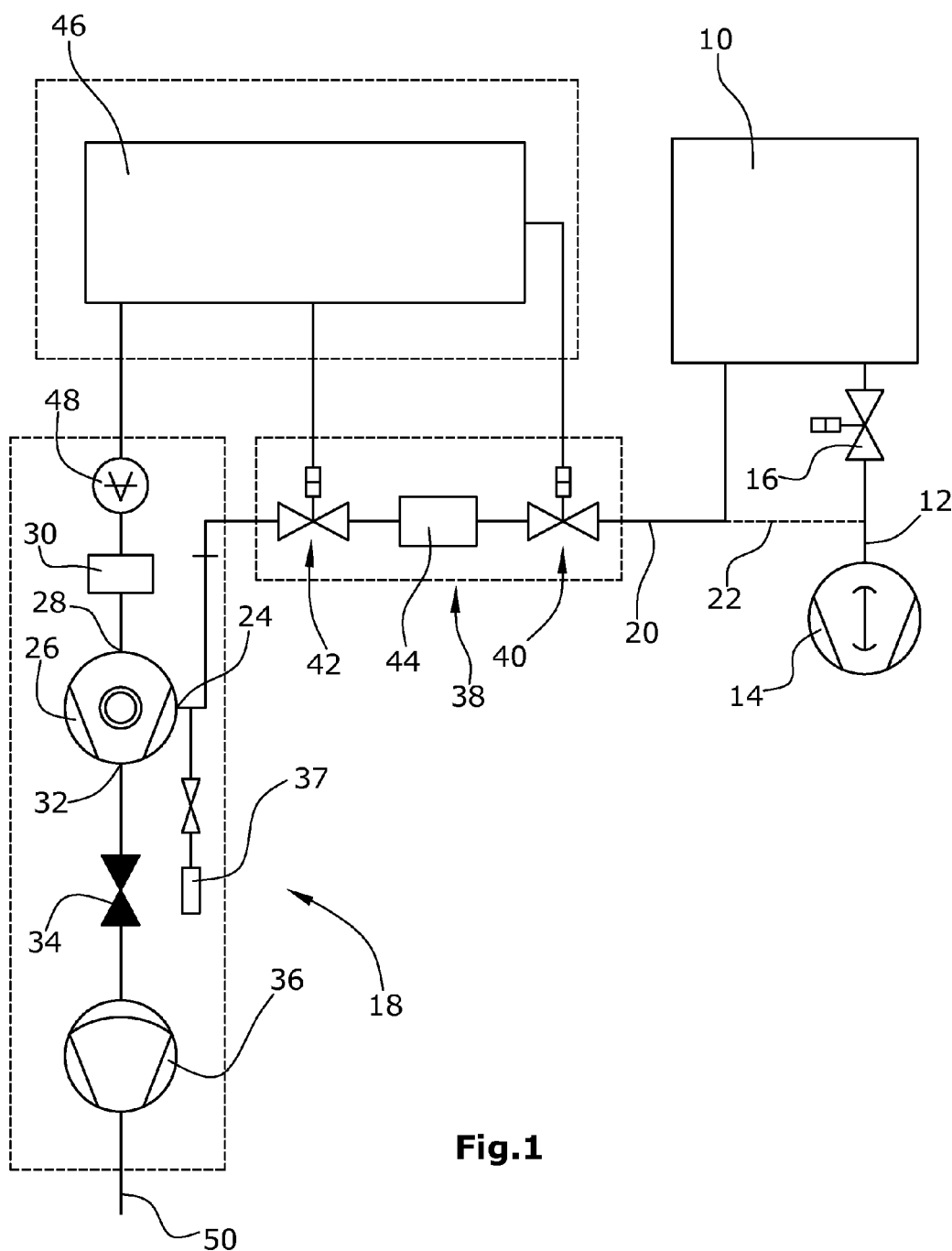
FIGS. 1-3 are schematic illustrations of different preferred embodiments of leak detector devices of the present disclosure.

An object to be tested for tightness is arranged in a test chamber 10. The test chamber 10 is connected with a pump 14 via an evacuation line 12. Instead of providing an evacuation chamber 10, in which the object under test is arranged, it is also possible to immediately and directly evacuate the object. A controllable evacuation valve 16 is arranged in the evacuation line 12. For checking the tightness, the test chamber 10 or the object under test is connected with a test gas pump means 18 via a test gas line 20 Alternatively, as illustrated by the dotted line 22, the test gas line 20 can also be connected with the evacuation line 12 at a position downstream of the evacuation valve 16 in the flow direction.

The test gas line 20 is connected with an intermediate inlet 24 of a pump 26 of the test gas pump means 18, illustrated as a turbomolecular pump in the present embodiment. A test gas detector 30 is connected with the main inlet 28 of the turbomolecular pump. An outlet 32 of the turbomolecular pump is connected with a backing pump 36 with interposition of a valve 34.

According to the disclosure, a valve means 38 is arranged in the test gas line 20. In the first embodiment illustrated in FIG. 1, the valve means has a first controllable valve 40 and a second, also controllable valve 42 arranged downstream of the former in the flow direction. A test gas chamber 44 is provided between the two valves 40, 42. Both the two controllable valves 40, 42 and the test gas detector 30 are connected with a control means 46. Further, a pressure metering means 48 can be arranged in a connecting line from the control means 46 to the test gas detector 30. Moreover, the control of the evacuation valve 16 can be effected via the control means 46.

Further, a calibration means 37 is arranged in the test gas line 20 preferably immediately upstream of the intermediate inlet 24.

For checking the tightness of the object under test, the test gas pump means 18 is used to generate a very low pressure in the region of the test gas detector 30. Likewise, the evacuation pump means 14 is used in the embodiment illustrated to evacuate the test chamber 10 or immediately the object under test, with a higher pressure prevailing at the beginning of the check, i.e. during a coarse leak detection. For a coarse leak detection, the valve 40 is then opened so that a small volume of test gas flows into the test gas chamber 44. Then, the valve 40 is closed and the valve 42 is opened. The test gas flows from the test gas chamber 44 through the intermediate inlet 24 into the turbomolecular pump 26. The turbomolecular pump 26 and the backing pump 36 pump the test gas along the main flow path towards an outlet 50. A small volume flows against the main flow path or the main flow direction, according to the counter-flow principle, from the intermediate inlet 24 in the direction of the main inlet 28 of the turbomolecular pump and then reaches the test gas detector 30. When the test gas detector detects the test gas, such as helium, for instance, a corresponding signal is generated and the check is terminated, since the rough examination already yielded the result that the object under test has a leak.

If in this step of the check the test gas detector 30 does not yet detect test gas, the test gas pump means 18 is again brought to the initial low pressure. At the same time, the pressure in the test chamber 10 or in the object under test is reduced, with a lower pressure now being reached. In the next step of the check, the valve 40 is again opened first, so that gas flows into the test gas chamber 44. Subsequently, the valve 40 is closed and the valve 42 is opened as before, in order to convey, as described above, the gas present in the test gas chamber 44 through the turbomolecular pump 26 and to the test gas detector 30. According to the first method step, the test gas detector 30 again performs a detection and correspondingly outputs a signal, when a leakage could be detected.

Thereafter, this step may be repeated several times. with the pressure in the test chamber 10 ever decreasing, so that the tightness check becomes ever finer.

It is an essential advantage of the leak detector device of the present disclosure that always only a small volume of test gas, the volume of the test gas chamber 44, has to be pumped by the test gas pump means 18. This is advantageous in that the test gas can be introduced at an intermediate inlet 24 arranged near the main inlet 28 and already being at a very low pressure level. This, in turn, has the advantage that the counter-flow path that the test gas has to travel to the test gas detector 30 is short, so that the fast detection can be made. Moreover, it is always necessary to clean the test gas pump means 18 before checking a new object, provided that a leak has been detected during a prior check. The helium present in the system must be pumped away completely. Since, according to the disclosure, only a small volume of test gas is supplied to the system, a corresponding cleaning can be carried out very quickly. This means a significant improvement in the economic efficiency of the leak detector device.

In the embodiment (FIGS. 2 and 3) described hereunder, similar components are identified by the same reference numerals.

Figure 2:
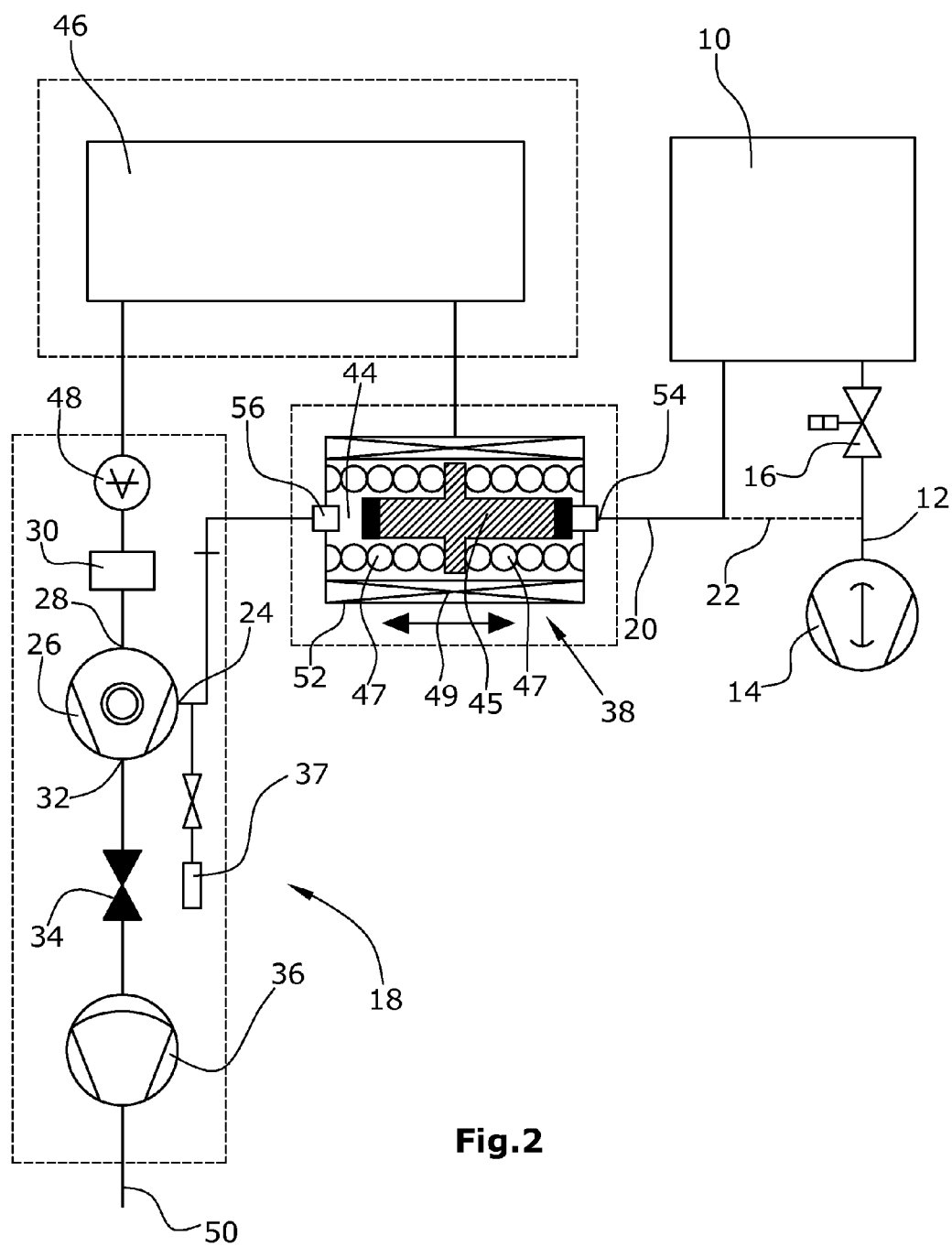

The embodiment illustrated in FIG. 2 differs from the embodiment illustrated in FIG. 1 merely by the design of the valve means 38. In this embodiment, the valve means 38 comprises a single valve 52 configured as a valve with an integrated test gas chamber. The valve 52 has an inlet 54 and an outlet 56. When the valve inlet opens 53, test gas flows through the test gas line 22 into the integrated test chamber 44. The gas present in the test gas chamber 44 can leave the valve via the outlet 56 after the inlet 54 has been closed and reaches, as described above, the test gas pump means 18.

The valve 52 is opened and closed by displacing a double piston 45. This is done by means of springs 47 and a correspondingly controlled solenoid 49.

The tightness check of the object is done analogously to the check described with reference to FIG. 1.

Figure 3:
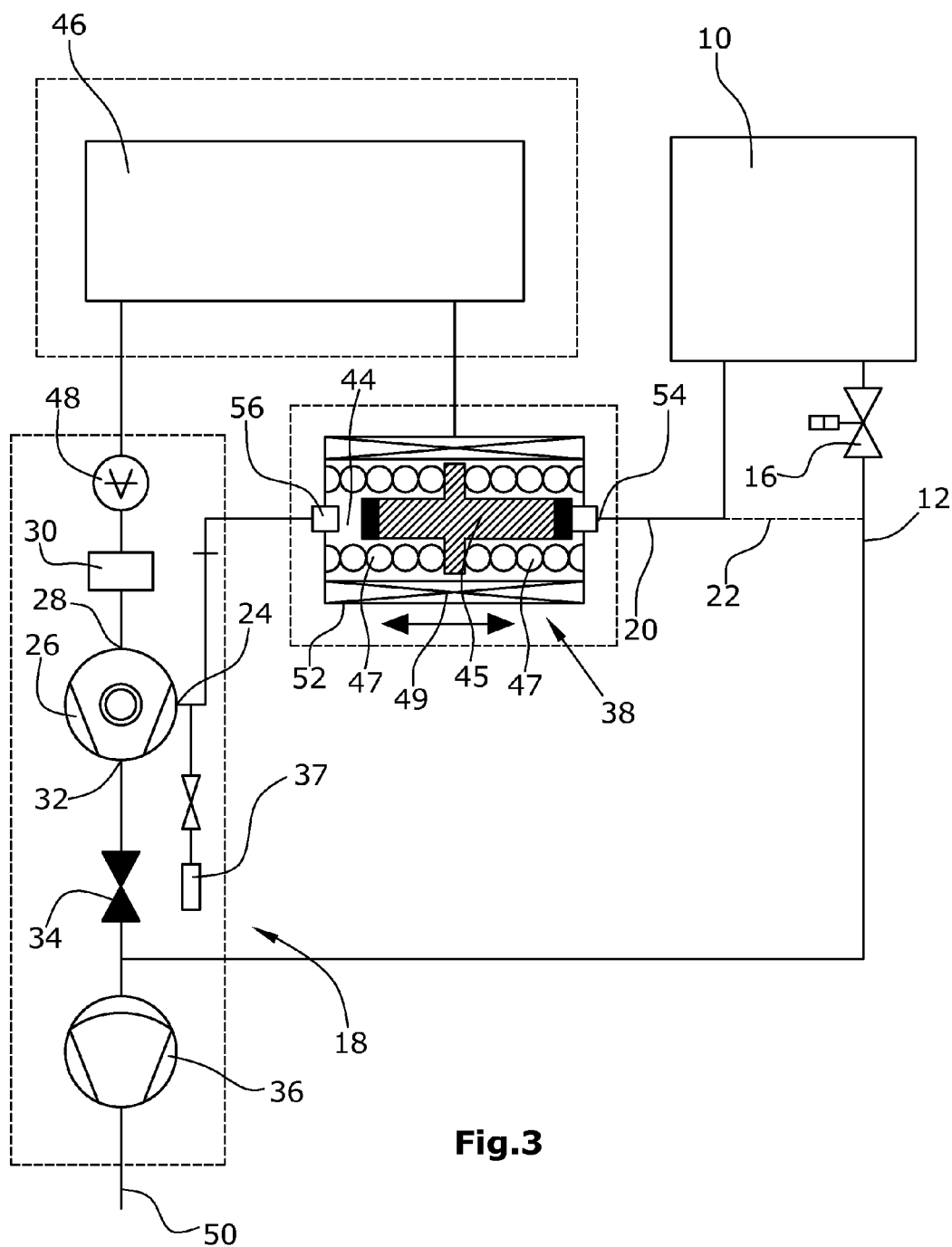

The embodiment illustrated in FIG. 3 substantially corresponds to the embodiment in FIG. 2 and also comprises a valve 52 with an integrated volume. The sole difference is that the evacuation line 12 is connected with the backing pump 36 of the test gas pump means 18 for the evacuation of the test chamber 10. The backing pump 36 thus serves as the evacuation pump means for the evacuation of the test chamber 10 or of the object to be tested. A separate pump 14, as illustrated in the embodiments in FIGS. 1 and 2, can be omitted.

Of course, the valve means 38 illustrated in FIG. 1 can also find application in the embodiment in FIG. 3.

What is claimed is:

1. A leak detector device comprising
    a test chamber and/or an object to be tested, which is connected with an evacuation pump for evacuation,
    a test gas line connected with the test chamber and/or the object to be tested and an intermediate inlet of a test gas pump,
    a test gas detector arranged at a main inlet of the test gas pump, wherein the test gas pump comprises at least one rotor element, so that a main flow path is defined from the main inlet along the at least one rotor element to an outlet, and wherein a counter-flow path extends from the intermediate inlet to the main inlet, and
    a valve device with a test gas chamber, arranged in the test gas line, to buffer test gas drawn from the test chamber or the object under test to be supplied to the intermediate inlet of the test gas pump.

2. The leak detector device of claim 1, wherein the valve device comprises a first valve upstream of the test gas chamber in the flow direction and a second valve downstream of the test gas chamber in the flow direction.

3. The leak detector device of claim 2, further comprising a control which opens the first valve to draw test gas from the test chamber and/or the object under test and opens the second valve to supply the test gas to the test gas pump.

4. The leak detector device of claim 3, wherein the control ensures that the second valve opens only after the first valve has been closed.

5. The leak detector device of claim 1, wherein the valve device comprises a single valve with an integrated test gas chamber.

6. The leak detector device of claim 5, wherein by displacing a double piston the inlet or the outlet of the single valve can be closed or opened, respectively.

7. A method for checking objects for tightness using the leak detector device of claim 1, wherein a test gas is drawn from the test chamber and/or an object under test into the test gas chamber,
    a connection between the test gas chamber and the test chamber or the object under test is interrupted, and
    the drawn test gas is supplied from the test gas chamber to the test gas pump, wherein, for a measurement according to the counter-flow principle, the test gas pump is supplied via an intermediate inlet and flows partially against a main flow path to a main inlet of the test gas pump where a test gas detector is arranged.

8. The method of claim 7, wherein the test gas is supplied from the test gas chamber to the test gas pump only when a predetermined pressure level prevailing in the test gas pump is reached.

9. The method of claim 8, wherein test gas is drawn, successively at different pressure levels, from the test chamber and/or the object under test and is supplied to the test gas pump.

10. The method of claim 7, wherein the test chamber and/or the object under test are evacuated by an evacuation pump independently of the test gas pump.

\* \* \* \* \*